US012794655B2

(12) United States Patent
Kim et al.

(10) Patent No.: US 12,794,655 B2
(45) Date of Patent: Nov. 10, 2026

(54) INTERFERENCE CANCELLATION CIRCUIT AND OPERATING METHOD THEREOF

(71) Applicant: SAMSUNG ELECTRONICS CO., LTD., Suwon-si (KR)

(72) Inventors: Daeyoung Kim, Suwon-si (KR); Joontae Kim, Suwon-si (KR); Hyunseok Yu, Suwon-si (KR); Gangminh Lee, Suwon-si (KR); Youngik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 18/540,065

(22) Filed: Dec. 14, 2023

(65) Prior Publication Data

US 2024/0204977 A1 Jun. 20, 2024

(30) Foreign Application Priority Data

Dec. 15, 2022 (KR) ........................ 10-2022-0176245

(51) Int. Cl.
*H04L 5/14* (2006.01)

(52) U.S. Cl.
CPC .................................. *H04L 5/1461* (2013.01)

(58) Field of Classification Search
CPC .......... H04L 5/1461; H04B 1/525; H04B 1/10
See application file for complete search history.

(56) References Cited

U.S. PATENT DOCUMENTS

| | | | |
|---|---|---|---|
| 9,166,635 B2 | 10/2015 | Carbone et al. |
| 9,438,284 B2 | 9/2016 | Wang et al. |

(Continued)

FOREIGN PATENT DOCUMENTS

| | | |
|---|---|---|
| CN | 113433523 B | 9/2022 |
| KR | 10-2102059 B1 | 4/2020 |
| WO | 2021/225667 A1 | 11/2021 |

OTHER PUBLICATIONS

Constantin Paleologu et al., "A Robust Variable Forgetting Factor Recursive Least-Squares Algorithm for System Identification", IEEE Signal Processing Letters, vol. 15, pp. 597-600, Oct. 7, 2008, DOI: 10.1109/LSP.2008.2001559.

(Continued)

*Primary Examiner* — Gary Mui
*Assistant Examiner* — Yewon Kim
(74) *Attorney, Agent, or Firm* — Sughrue Mion, PLLC

(57) ABSTRACT

An interference cancellation circuit includes: an activation circuit configured to receive at least one transmission path signal and a reception path signal and configured to generate an activation control signal based on at least one of the reception path signal and the at least one transmission path signal; a forgetting factor control circuit configured to compare a control metric with a plurality of threshold values and control a forgetting factor value based on the control metric compared with the plurality of threshold values; a kernel generation circuit configured to receive a transmission signal corresponding to the at least one transmission path signal and configured to generate an interference model; and an adaptive filter configured to receive a kernel signal from the kernel generation circuit, and configured to receive the forgetting factor value from the forgetting factor control circuit to cancel self-interference.

20 Claims, 13 Drawing Sheets

(56) References Cited

U.S. PATENT DOCUMENTS

| | | | | |
|---|---|---|---|---|
| 9,455,761 | B2 | 9/2016 | Bharadia et al. | |
| 9,787,459 | B2 | 10/2017 | Azadet | |
| 10,193,683 | B2 | 1/2019 | Chen et al. | |
| 11,101,841 | B2 | 8/2021 | Noest et al. | |
| 11,139,946 | B2 | 10/2021 | Nallampattiekambaram et al. | |
| 11,239,900 | B2 | 2/2022 | Huang et al. | |
| 2018/0026775 | A1* | 1/2018 | Chen | H04B 1/525 370/278 |
| 2019/0013923 | A1* | 1/2019 | Liu | H04L 5/14 |
| 2022/0094512 | A1* | 3/2022 | Kolodziej | H04B 1/525 |
| 2024/0080053 | A1* | 3/2024 | Velazquez | H04B 1/40 |
| 2024/0179033 | A1* | 5/2024 | Kim | H04B 1/525 |
| 2025/0317334 | A1* | 10/2025 | Kim | H04B 1/525 |

OTHER PUBLICATIONS

Communication issued Apr. 25, 2024 by the European Patent Office in European Patent Application No. 23217013.4.

Emara, Mustafa et al., "Nonlinear Digital Self-Interference Cancellation with Reduced Complexity for Full Duplex Systems", WSA 2017, Mar. 15-17, 2017, pp. 129-134. (6 pages total).

* cited by examiner

INTERFERENCE CANCELLATION CIRCUIT AND OPERATING METHOD THEREOF

CROSS-REFERENCE TO RELATED APPLICATION

This application is based on and claims priority under 35 U.S.C. § 119 to Korean Patent Application No. 10-2022-0176245, filed on Dec. 15, 2022, in the Korean Intellectual Property Office, the disclosure of which is incorporated by reference herein in its entirety.

BACKGROUND

1. Field

The disclosure relates to an interference cancellation circuit and an operating method thereof, and more particularly, to an interference cancellation circuit and an operating method thereof to cancel self-interference from a transmission signal.

2. Description of Related Art

A wireless communication system may employ various techniques to increase throughput. For example, the wireless communication system may employ multiple-input and multiple-output (MIMO) that increases communication capacity by using multiple antennas. With the adoption of techniques for increasing throughput, a transmitter may transmit signals with high complexity, while a receiver may be required to process signals with high complexity.

Interference signals may prevent the receiver from processing signals received through an antenna, and the interference signals may occur in various ways. For example, the interference signals may include inter cell interference, which is a signal received from a neighboring base station at a boundary of a serving base station, intra cell interference corresponding to radio signals from other terminals within a coverage of the serving base station, channel interference, and the like.

In addition to the interference signal received through the antenna, there is also an interference signal generated by leakage of the transmission signal into the reception path or by coupling of the transmission signal on the reception path within a terminal. In a case of a self-interference signal generated in the terminal, since the power-amplified transmission signal is fed back as the interference signal as it is, a large influence on the deterioration of the reception sensitivity is caught. Accordingly, a method of more efficiently cancelling the self-interference signal generated in the terminal is required.

SUMMARY

Provided are an interference cancellation circuit that variably adjusts a forgetting factor and an operating method thereof.

According to an aspect of the disclosure, an interference cancellation circuit includes: an activation circuit configured to receive at least one transmission path signal and a reception path signal and configured to generate an activation control signal based on at least one of the reception path signal and the at least one transmission path signal; a forgetting factor control circuit configured to compare a control metric with a plurality of threshold values and control a forgetting factor value based on the control metric compared with the plurality of threshold values; a kernel generation circuit configured to receive a transmission signal corresponding to the at least one transmission path signal and configured to generate an interference model; and an adaptive filter configured to receive a kernel signal from the kernel generation circuit, and configured to receive the forgetting factor value from the forgetting factor control circuit to cancel self-interference.

According to another aspect of the disclosure, an operating method performed by an interference cancellation circuit, includes: receiving a transmission path signal and a reception path signal; generating an activation control signal based on the transmission path signal and the reception path signal; setting a forgetting factor to a smallest first value from among a set of a first value to an N-th value based on the activation control signal; and comparing a control metric with a plurality of threshold values and setting the forgetting factor up to the N-th value based on the control metric compared with the plurality of threshold values.

According to another aspect of the disclosure, a wireless communication device includes: a first transmission radio frequency (RF) chain configured to output a first transmission signal; a second transmission RF chain configured to output a second transmission signal; a reception RF chain corresponding to a reception path in which a reception signal is input; and an interference cancellation circuit including: an activation circuit configured to generate an activation control signal in response to receiving (i) a first transmission path signal corresponding to the first transmission RF chain, (ii) a second transmission path signal corresponding to the second transmission RF chain, and (iii) a reception path signal corresponding to the reception RF chain, a forgetting factor control circuit configured to compare a control metric with a plurality of threshold values and configured to control a forgetting factor value based on the compared control metric with the plurality of threshold values, a kernel generation circuit configured to receive the first transmission signal and the second transmission signal and configured to generate an interference model, and an adaptive filter configured to receive a kernel signal from the kernel generation circuit, and configured to receive the forgetting factor value from the forgetting factor control circuit to cancel self-interference.

BRIEF DESCRIPTION OF DRAWINGS

Embodiments of the disclosure will be more clearly understood from the following detailed description taken in conjunction with the accompanying drawings in which.

DETAILED DESCRIPTION

Hereinafter, embodiments of the disclosure will be described in detail with reference to the accompanying drawings.

Figure 1A:
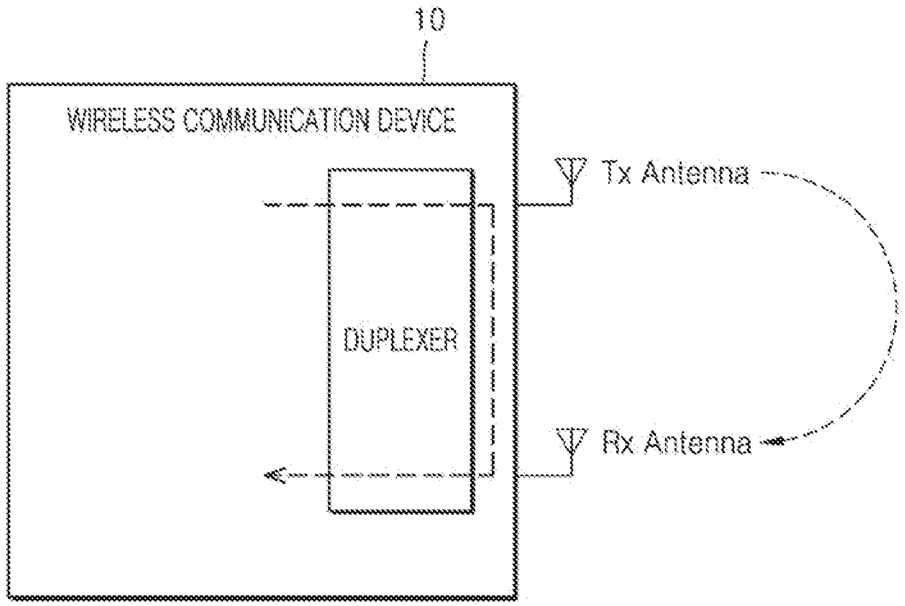
FIGS. 1A and 1B illustrate an example of self-interference by a transmission signal.
Figure 1B:
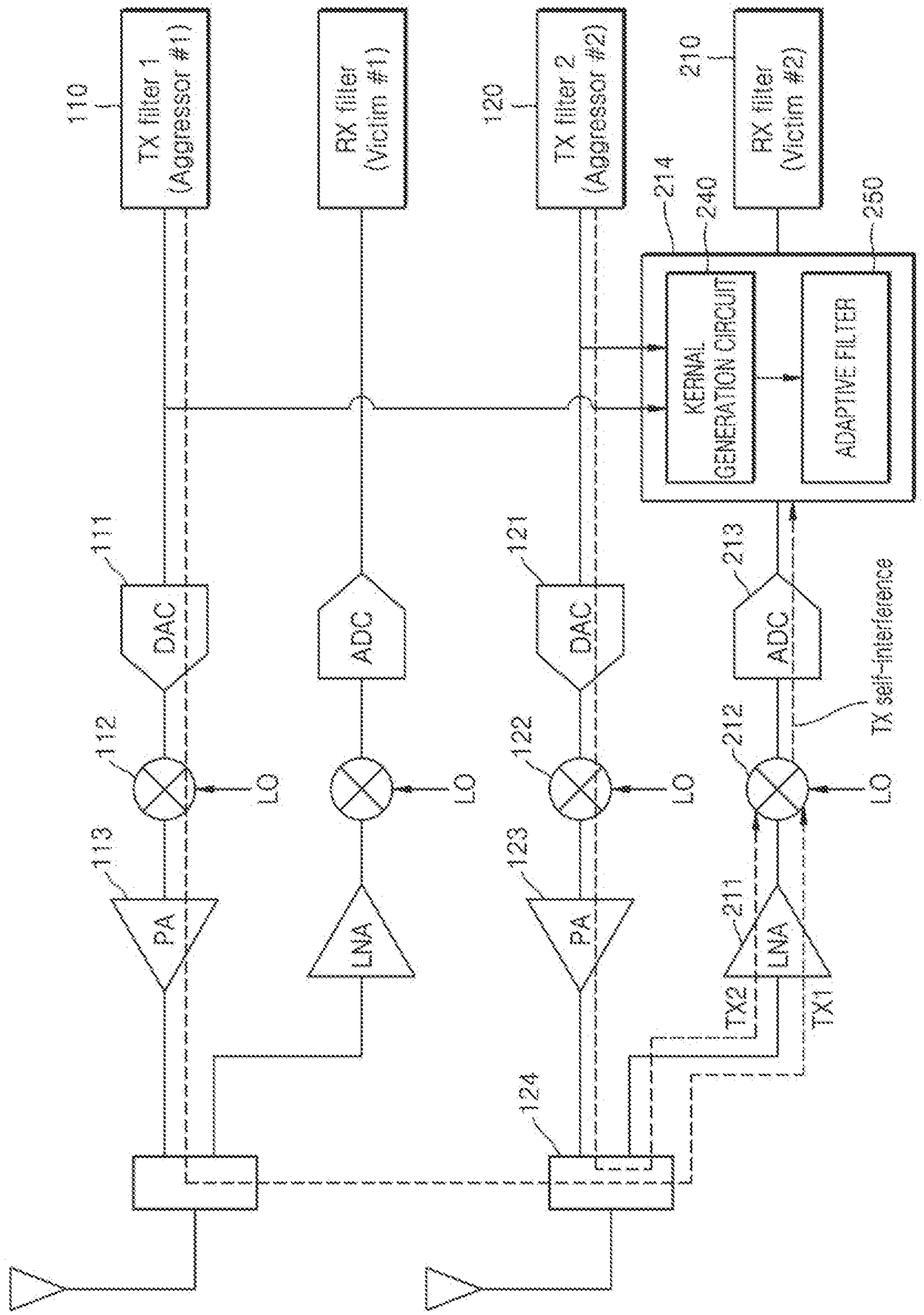

FIGS. 1A and 1B illustrate an example of self-interference by a transmission signal.

Referring to FIG. 1A, a wireless communication device 10 may include a transmission antenna ("Tx Antenna") and a reception antenna ("Rx Antenna"). The single antenna may be connected to both a transmission radio frequency (RF) chain and a reception RF chain through a duplexer. For example, the wireless communication device 10 may receive a wireless signal through the reception RF chain in a receiving mode, and may transmit a baseband signal to an external device through the transmission RF chain in a transmitting mode. In one embodiment, the transmission RF chain may include an antenna, a power amplifier, and a digital-to-analog converter, as shown in FIG. 1B. In one embodiment, the reception RF chain may include an antenna, a low noise amplifier, and an analog-to-digital converter, as shown in FIG. 1B.

According to one or more embodiments, in a case of a wireless communication device 10 including a transmission antenna and a reception antenna connected through a duplexer, feedback of a transmission signal based on a transmission antenna and a reception antenna adjacent to each other may occur. However, since the duplexer is connected to both the transmission RF chain and the reception RF chain, at least a part of the transmission signal may leak from the transmission RF chain into the reception RF chain. When the leaked signal is input to the reception RF chain, self-interference may occur.

According to one or more embodiments, the reception antenna may receive a wireless signal transmitted from the transmission antenna as well as a wireless signal transmitted from the external device. For example, when the transmission antenna and the reception antenna correspond to non-directed antennas and the transmission antenna is arranged to be adjacent to the reception antennas, some of the transmitted wireless signals may be fed back through the reception antenna. Self-interference may also occur based on the fed back wireless signal.

Referring to FIG. 1B, a first transmission signal TX1 and a second transmission signal TX2 may be transmitted. That is, the wireless communication device 10 may include two antennas. One of the two antennas may be an antenna for transmitting only a transmission signal, and the other of the two antennas may be an antenna for transmitting and receiving signals.

For example, a particular frequency band may be filtered from the first transmission signal TX1 through a first transmission filter 110 and a digital signal may be converted to an analog signal through a first digital-to-analog converter (DAC) 111. Thereafter, the transmission frequency of the first transmission signal TX1 may be upwardly converted by a local oscillator (LO) frequency received from an LO through a first mixer 112, amplified through a first power amplifier (PA) 113, and then, transmitted to an external device (e.g., a base station) through an antenna. A particular frequency band may be filtered from the second transmission signal TX2 through a second transmission filter 120 and a digital signal may be converted to an analog signal through a second DAC 121. Thereafter, the transmission frequency of the second transmission signal TX2 may be upwardly converted by the LO frequency received by a second mixer 122, amplified through a second PA 123, and then transmitted to the external device through an antenna.

According to one or more embodiments, the wireless communication device 10 may perform carrier aggregation or dual connectivity, and the first transmission filter 110, the second transmission filter 120, and a reception filter 210 may all be in an ON state. In this case, when self-interference occurs, the first transmission signal TX1 amplified through the first PA 113 may be coupled onto a neighboring reception RF chain. For example, the first transmission signal TX1 may be input to a low noise amplifier (LNA) 211 of the reception RF chain as a reception signal. In addition, the second transmission signal TX2 may leak from the transmission RF chain connected through a duplexer 124. That is, the second transmission signal TX2 may be input to the LNA 211 as a reception signal through the duplexer 124. The first transmission signal TX1 and the second transmission signal TX2 generate an interference signal near the reception frequency due to nonlinear characteristics of the reception RF chain, which may be converted downward again by the LO frequency received by a third mixer 212, and may be converted into a digital signal through an analog-to-digital converter (ADC) 213. Thereafter, the interference signal generated by the first transmission signal TX1 and the second transmission signal TX2 may be cancelled through an interference cancellation circuit 214 according to a comparative example.

According to the comparative example, the interference cancellation circuit 214 may further include a kernel generation circuit 240 and an adaptive filter 250. The kernel generation circuit 240 may be a circuit for reproducing (or regenerating) an interference model by receiving the interference signal (e.g., the first transmission signal TX1 and the second transmission signal TX2). The adaptive filter 250 may generate an interference signal by estimating coefficients of the kernel generation circuit 240 and may filter the interference signal by subtracting the interference signal from the received signal. In one embodiment, the adaptive filter 250 may perform a filtering based on a Recursive Least Square (RLS) algorithm. In one embodiment, the adaptive filter 250 may be based on a Kalman filter.

The RLS algorithm may be fast to estimate the coefficients of the kernel generation circuit 240 in a steady state signal environment and may have good mean square error (MSE) performance, but since the RLS algorithm has a fixed forgetting factor, the rate and MSE performance of estimating the coefficients of the kernel generation circuit 240 in a transient state may degrade. For example, in a case of an adaptive filter 250 based on a general RLS algorithm, when the forgetting factor becomes close to 1, the convergence rate becomes slower, but the MSE performance in the steady state is improved. In contrast, when the forgetting factor becomes close to 0, the convergence rate becomes faster, but instead the MSE performance in the steady state may be reduced.

The transient state is caused by a change in the interference channel, and the change of the interference channel happens because the analog and digital blocks are turned on/off and the magnitude and phase of the interference channel are arbitrarily changed while idle-Discontinuous Reception (DRX), Connected Mode DRX (C-DRX), Discontinuous Transmission (DTX), etc. operate to reduce power of the wireless communication device 10. As an example, when the transmission RF chain is changed from OFF to ON or the reception RF chain is changed from OFF to ON, random phases of a 90° interval may occur in the I/Q signal distributor of the LO. As another example, when the first DAC 111 and the second DAC 121 of the transmission RF chain and the ADC 213 of the reception RF chain change from OFF to ON, a random phase may occur according to a First In First Out (FIFO) start time point. As another example, the initial values may be set differently between the first mixer 112 and the second mixer 122 of the transmission RF chain and a mixer included in the kernel generation circuit 240.

Figure 2A:
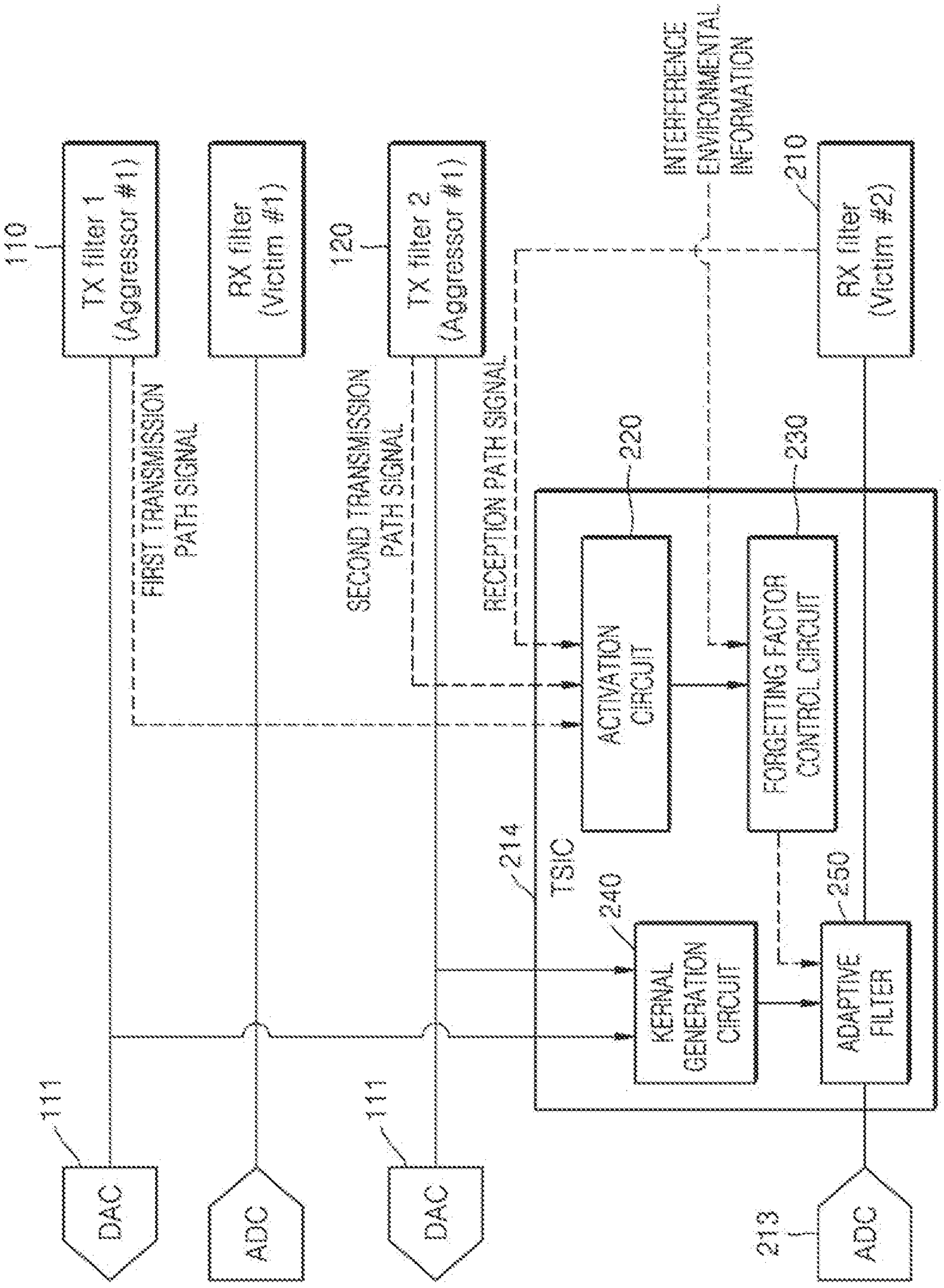
FIG. 2A illustrates an interference cancellation circuit according to embodiments of the disclosure.

FIG. 2A is a block diagram of an interference cancellation circuit 214 according to embodiments of the disclosure.

Referring to FIG. 2A, the interference cancellation circuit (TSIC) 214 according to embodiments of the disclosure may include an activation circuit 220, a forgetting factor control circuit 230, the kernel generation circuit 240, and the adaptive filter 250. The interference cancellation circuit 214 according to the embodiments of the disclosure may variably set a value of a forgetting factor according to a control metric (for example, time, MSE, and mean square residual (MSR)) so as to estimate a coefficient on the basis of a high convergence rate at a time point immediately after the interference channel has changed (for example, in a transient state), and may obtain high MSE performance when the kernel coefficient converges (for example, in a normal state).

According to an embodiment, the activation circuit 220 may generate a control signal for activating the forgetting factor control circuit 230. The control signal may be referred to as various terms including an activation signal, an active signal, an enable signal, and a valid masking signal. The activation circuit 220 may be referred to as various terms including a valid mask circuit and a variable forgetting factor activation circuit.

The activation circuit 220 may receive the transmission path signal and the reception path signal and generate an activation control signal. The transmission path signal may be a signal indicating activation of the transmission RF chain. The transmission path signal may be generated by a transmission filter. The transmission filter may be configured to generate a transmission path signal in response to the transmission filter being turned on or activated, and to provide the transmission path signal to the activation circuit 220. For example, the activation circuit 220 may receive a first transmission path signal from the first transmission filter 110 and a second transmission path signal from the second transmission filter 120. The reception path signal may be a signal indicating activation of the reception RF chain. The reception path signal may be generated by the reception filter 210. The reception filter 210 may be configured to generate the reception path signal and provide the same to the activation circuit 220 in response to the reception filter 210 being turned on or activated. For example, the activation circuit 220 may receive the reception path signal from the reception filter 210.

The activation circuit 220 may generate the activation control signal when both the transmission path signal and the reception path signal are "ON" or "Logic High". That is, the activation circuit 220 may generate the activation control signal when activating all transmission RF chains and outputting a transmission signal and activating all reception RF chains and receiving a reception signal including the transmission signal as an interference signal. The activation circuit 220 generates the activation control signal when all transmission path signals and all reception path signals are logic high, which may be possible because self-interference by transmission signals may occur only when the transmission signals are in transmission, and the interference coefficient may be estimated only when the reception RF chain is active.

The interference cancellation circuit 214 according to the comparative example of FIG. 1B needs time to calculate the trigger metric of the MSE to detect the change in the interference coefficient, whereas the activation circuit 220 in the interference cancellation circuit 214 according to the disclosure may quickly trigger the change in the forgetting factor in response to the input of the activation control signal and thus, may lower the complexity and quickly respond to the interference change when an appropriate forgetting factor value is selected.

Figure 2B:
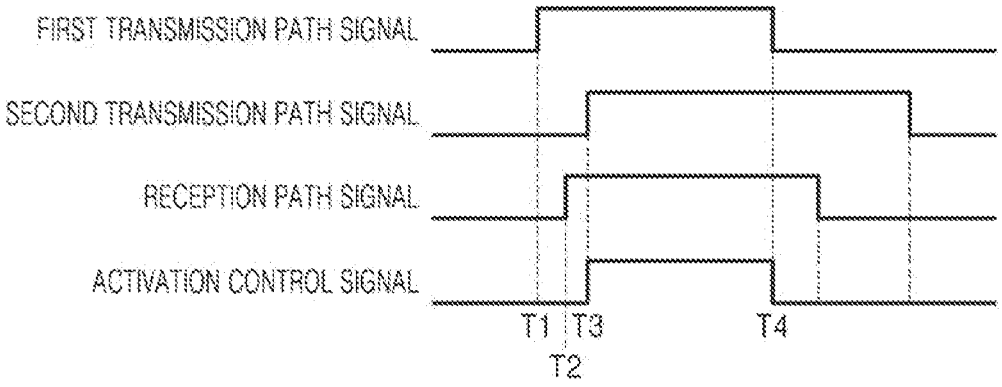
FIG. 2B illustrates input/output signals of an activation circuit according to embodiments of the disclosure.

Referring also to FIG. 2B, a first transmission path signal may be activated at a time point T1. At the time point T1, the activation circuit 220 may receive the first transmission path signal. However, since the reception RF chain is in an inactive state, the coefficient estimation of the interference signal may not be performed, and thus, the activation control signal may not be generated. The reception path signal may be activated at a time point T2. Since the reception RF chain is active, the coefficient of the interference signal may be estimated, but since the remaining transmission RF chains are inactive, the activation circuit 220 may still not generate the activation control signal. The second transmission path signal may be activated at a time point T3. Since transmission path signals corresponding to all transmission RF chains are received and reception path signals corresponding to all reception RF chains are received, the activation circuit 220 may generate an activation control signal to start coefficient estimation of the interference signal and provide the same to the forgetting factor control circuit 230. For example, the activation circuit 220 may generate the activation control signal in response to the transmission path signals corresponding to all transmission RF chains, and reception path signals corresponding to all reception RF chains, being received. The activation control signal may be generated only during time points T3 to T4. This is because the first transmission path signal is transitioned to "logic low" at a time point T4. The activation circuit 220 may not generate an activation control signal when at least one of the first transmission path signal, the second transmission path signal, and the reception path signal transitions to logic low. For example, the activation circuit 220 may be responsive to at least one of said signals being low to not generate the activation control signal.

The forgetting factor control circuit 230 may (variably) control the value of the forgetting factor used in the RLS algorithm of the adaptive filter 250. The forgetting factor may have a value between 0 and 1, and the convergence rate of coefficient estimation increases as the forgetting factor value approaches 0, but the MSE performance in the steady state degrades and the convergence rate of coefficient estimation decreases as the forget factor value approaches 1, but the MSE performance in the steady state may be improved.

That is, the convergence rate and the MSE performance in the normal state may have a trade-off relationship with each other. The forgetting factor control circuit 230 may previously store a plurality of forgetting factor values.

According to an embodiment, the plurality of forgetting factor values may include N values between 0 and 1. In this case, N is a natural number of 2 or more. For example, when N=2, the forgetting factor control circuit 230 may previously store a first value of 0.75 and a second value of 0.995. For example, when N=3, the forgetting factor control circuit 230 may have a first value of 0.75, a second value of 0.85, and a third value of 0.995. According to another embodiment, the plurality of forgetting factor values may include N values that increase nonlinearly according to a preset function from 0 to 1.

The forgetting factor control circuit 230 may start variably setting the forgetting factor in response to receiving an activation control signal from the activation circuit 220. That is, when the forgetting factor control circuit 230 receives the activation control signal from the activation circuit 220, all transmission RF chains and all reception RF chains are activated based on the reception time point of the activation control signal, to identify whether to cause self-interference by the transmission signal. The forgetting factor control circuit 230 may change the forgetting factor to a first value in response to the activation control signal.

According to one or more embodiments, the forgetting factor control circuit 230 may further obtain interference environmental information. The interference environmental information may include ON/OFF signals of all blocks causing self-interference by a transmission signal. For example, the interference environmental information may include an ON/OFF signal of a radio frequency integrated circuit (RFIC), an ON/OFF signal of an ADC, an ON/OFF signal of a DAC, an ON/OFF signal of a phase locked loop (PLL), an ON/OFF signal of a frequency locked loop (FLL), an ON/OFF signal from an Active Gain Control (AGC), an ON/OFF signal from a power amplifier, an ON/OFF signal of an LNA, an ON/OFF signal of a transmission filter, an ON/OFF signal of a reception filter, and an ON/OFF signal of a digital data interface connected in series.

The forgetting factor control circuit 230 may receive a control metric, compare a control metric value with a plurality of threshold values, and set a forgetting factor value corresponding to the comparison result. The control metric is a value that becomes a criterion for determining the forgetting factor control circuit 230 to variably change the forgetting factor. For example, the control metric may include at least a time, an MSE value, or an MSR value.

The kernel generation circuit 240 may be a circuit for reproducing an interference model by receiving the interference signal (e.g., the first transmission signal TX1 and the second transmission signal TX2). An interference signal may be generated by estimating a coefficient of the kernel generation circuit 240. A filtering of the interference signal may be performed by subtracting the interference signal from the received signal. For example, the adaptive filter 250 may receive a kernel signal from the kernel generation circuit 240 and receive a forgetting factor value from the forgetting factor control circuit 230. The adaptive filter 250 may change the forgetting factor of the RLS algorithm to the forgetting factor value received from the forgetting factor control circuit 230, generate an interference signal based on the RLS algorithm of the kernel signal received from the kernel generation circuit 240 and the changed forgetting factor value, and subtract the interference signal from the received signal input from the adaptive filter 250, to perform interference cancellation.

Figure 3:
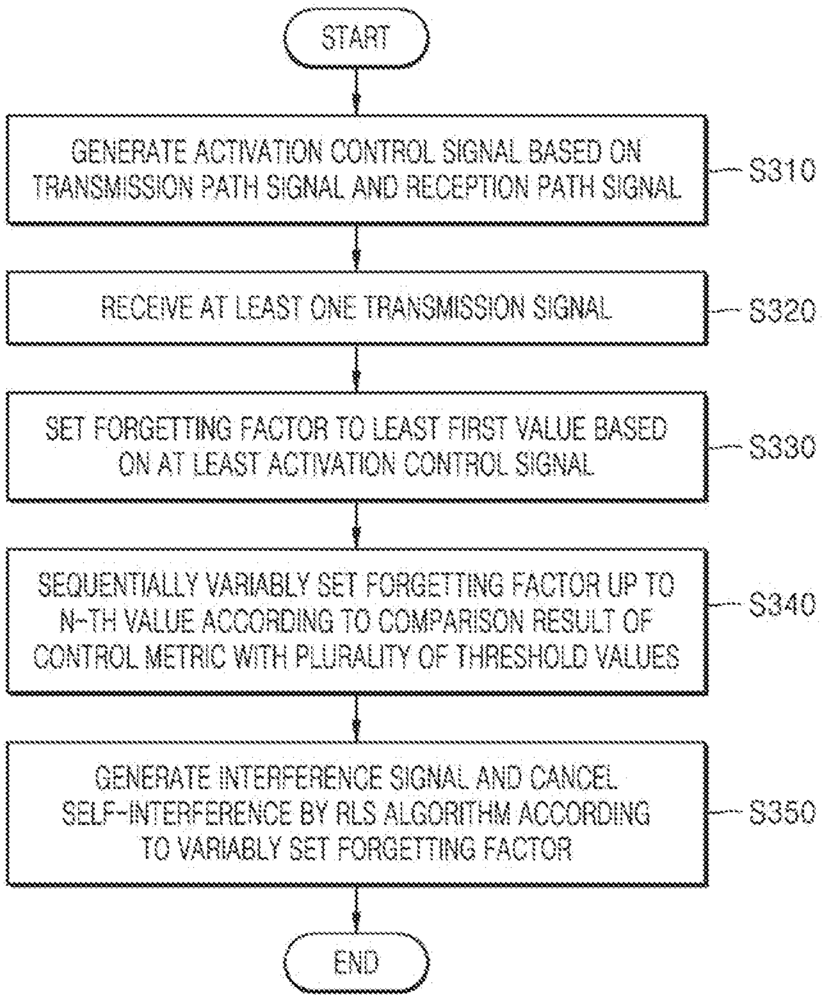
FIG. 3 illustrates an operating method of an interference cancellation circuit according to embodiments of the disclosure.

FIG. 3 is a flowchart illustrating an operating method of an interference cancellation circuit according to embodiments of the disclosure.

Referring to FIG. 3, in operation S310, the interference cancellation circuit 214 may generate an activation control signal based on a transmission path signal and a reception path signal or based on at least one of the transmission path signal and the reception path signal. The transmission path signal may be a signal for each transmission RF chain to instruct the activation circuit 220 to activate in response to activation of each transmission RF chain. For example, the activation circuit 220 may activate in response to signals on each transmission RF chain. The reception path signal may be a signal for the reception RF chain to instruct the activation circuit 220 to activate in response to the reception RF chain being activated. For example, referring also to FIG. 2A, the activation circuit 220 may receive a first transmission path signal, a second transmission path signal, and a reception path signal. In one embodiment, the activation circuit 220 may generate an activation control signal in response to receiving all of the first transmission path signal, the second transmission path signal, and the reception path signal. The activation control signal may be a control signal instructing that the forgetting factor used in the RLS algorithm of the adaptive filter 250 be variably set.

In operation S320, the interference cancellation circuit 214 may receive at least one transmission signal. The reception of the transmission path signal in operation S310 may mean outputting each of the transmission signals through each transmission RF chain. For example, referring also to FIG. 2A together, the kernel generation circuit 240 of the interference cancellation circuit 214 may receive a first transmission signal passing through the first transmission filter 110 and a second transmission signal passing through the second transmission filter 120. The kernel generation circuit 240 may re-generate an interference model based on the received first transmission signal and the received second transmission signal. The kernel generation circuit 240 may provide the re-generated interference model to the adaptive filter 250.

In operation S330, the interference cancellation circuit 214 may set the forgetting factor to the least first value based on at least the activation control signal. The forgetting factor control circuit 230 of the interference cancellation circuit 214 may start to variably set the forgetting factor in response to receiving the activation control signal. The forgetting factor control circuit 230 may previously store a plurality of forgetting factor values. For example, the forgetting factor control circuit 230 may previously store a first value to an N-th value. The first value to the N-th value may be values that increase with the same interval.

In operation S340, the interference cancellation circuit 214 may sequentially variably change and set the forgetting factor up to the N-th value according to the comparison result between the control metric and the plurality of threshold values. The control metric may serve as a determination criterion for changing the value of the forgetting factor, and may be at least one of time, MSE, and MSR. According to an embodiment, when the control metric is time, the forgetting factor control circuit 230 may change the forgetting factor value by continuously comparing a plurality of threshold values from the smallest threshold to the largest threshold over time. For example, the time value may be compared to a first threshold value at the first time point. When the time value is less than the first threshold value, the forgetting factor may be set to the first value. As time passes, when the time value of the control metric is greater than the first threshold value and less than the second threshold value, the forgetting factor may be set to the second value. In this case, the second value may be greater than the first value. The forgetting factor control circuit 230 may set the forgetting factor value to increase over time.

In operation S350, the interference cancellation circuit 214 may generate an interference signal and remove self-interference using an algorithm of the adaptive filter 250, such as RLS algorithm, based on a variably set forgetting factor. In operation S340, the forgetting factor value determined according to the comparison result between the plurality of threshold values and the control metric may be provided to the adaptive filter 250. The adaptive filter 250 may receive a kernel signal from the kernel generation circuit 240 and may obtain, from the forgetting factor control circuit 230, a value of the forgetting factor referenced in the RLS algorithm. The adaptive filter 250 may regenerate an interference signal using the kernel signal and the RLS algorithm based on the acquired forgetting factor. For example, the regenerated interference signal may be synthesized with a signal in which the first transmission signal is coupled to the reception RF chain and a signal in which the second transmission signal is input to the reception RF chain through the duplexer 124. The adaptive filter 250 may obtain a reception signal from which self-interference is cancelled by subtracting the reproduced interference signal from the entire reception signal input to the adaptive filter 250.

Figure 4:
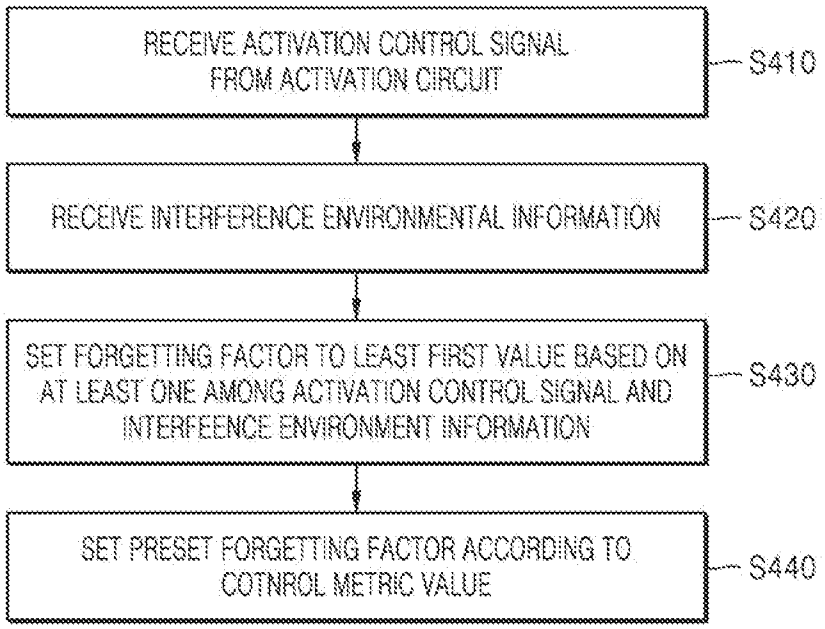
FIG. 4 illustrates an operating method of a forgetting factor control circuit according to embodiments of the disclosure.

FIG. 4 is a flowchart illustrating an operating method of a forgetting factor control circuit 230 according to embodiments of the disclosure.

Referring to FIG. 4, in operation S410, the forgetting factor control circuit 230 may receive an activation control signal from the activation circuit 220. The forgetting factor control circuit 230 may identify that the variable setting of the forgetting factor starts based on the activation control signal received from the activation circuit 220.

In operation S420, the forgetting factor control circuit 230 may receive interference environmental information. The interference environmental information may include ON/OFF signals of all blocks causing self-interference by a transmission signal. For example, the interference environmental information may include an ON/OFF signal of an RFIC, an ON/OFF signal of an ADC, an ON/OFF signal of a DAC, an ON/OFF signal of a PLL, an ON/OFF signal of an FLL, an ON/OFF signal from an AGC, an ON/OFF signal from a power amplifier, an ON/OFF signal of an LNA, an ON/OFF signal of a transmission filter, an ON/OFF signal of a reception filter, and an ON/OFF signal of a digital data interface connected in series.

In operation S430, the forgetting factor control circuit 230 may set the forgetting factor to the smallest first value based on at least one of the activation control signal and the interference environmental information. According to an embodiment, the forgetting factor control circuit 230 may set the forgetting factor to the first value based on only the activation control signal. That is, the reception of the activation control signal indicates that at least one of the transmission RF chains and the reception RF chains has shifted from “logic low” to “logic high”. Therefore, there may be a (high) probability that the magnitude and phase of the interference channel have changed as the RF chain is turned on, so it is necessary to quickly set the convergence rate of the coefficient estimation.

According to another embodiment, the forgetting factor control circuit 230 may set the forgetting factor to a first value based on the interference environmental information. In this case, the activation control signal may be a case where interference environmental information is newly received even though the activation control signal is continuously maintained at “logic high”. For example, although the transmission RF chains and the reception RF chains are not turned off or do not enter an inactive state, some of the transmission RF chains (e.g., the ON/OFF signal of the power amplifier, and the ON/OFF signal of the DAC) may be switched off and on for a certain period of time, and some of the reception RF chains (e.g., the ON/OFF signal of the LNA and the ON/OFF signal of the ADC) may be switched off and on for a certain period of time. As described above, even when some components of the RF chains are turned on again, a difference in the magnitude and phase of the interference channel may occur, and thus, the forgetting factor may be set to the first value for quick coefficient estimation. According to one or more embodiments, not only some configurations of the RF chains, but also ON/OFF signals of all blocks that may cause changes in the magnitude and phase of the interference channel, such as an FLL, a PLL, and AGC, may be considered.

In operation S440, the forgetting factor control circuit 230 may set a preset forgetting factor according to a control metric value. As described above, the control metric may be any one of time, MSE, and MSR, and the setting value of the forgetting factor may be changed according to the comparison result with the plurality of preset threshold values. For example, the forgetting factor control circuit 230 may compare a time value elapsed from the time point of receiving the activation control signal with the plurality of threshold values. When the time value is less than the least first threshold value among the plurality of threshold values, the forgetting factor control circuit 230 may set the forgetting factor value to the first value. The first value may be the least value among the plurality of values that may be set in the forgetting factor. Over time, when the time value is greater than the first threshold value and less than the second threshold value, the forgetting factor control circuit 230 may set the forgetting factor value to the second value. In this case, the second threshold value may be greater than the first threshold value, and the second value set as the forgetting factor value may be greater than the first value.

Figure 5:
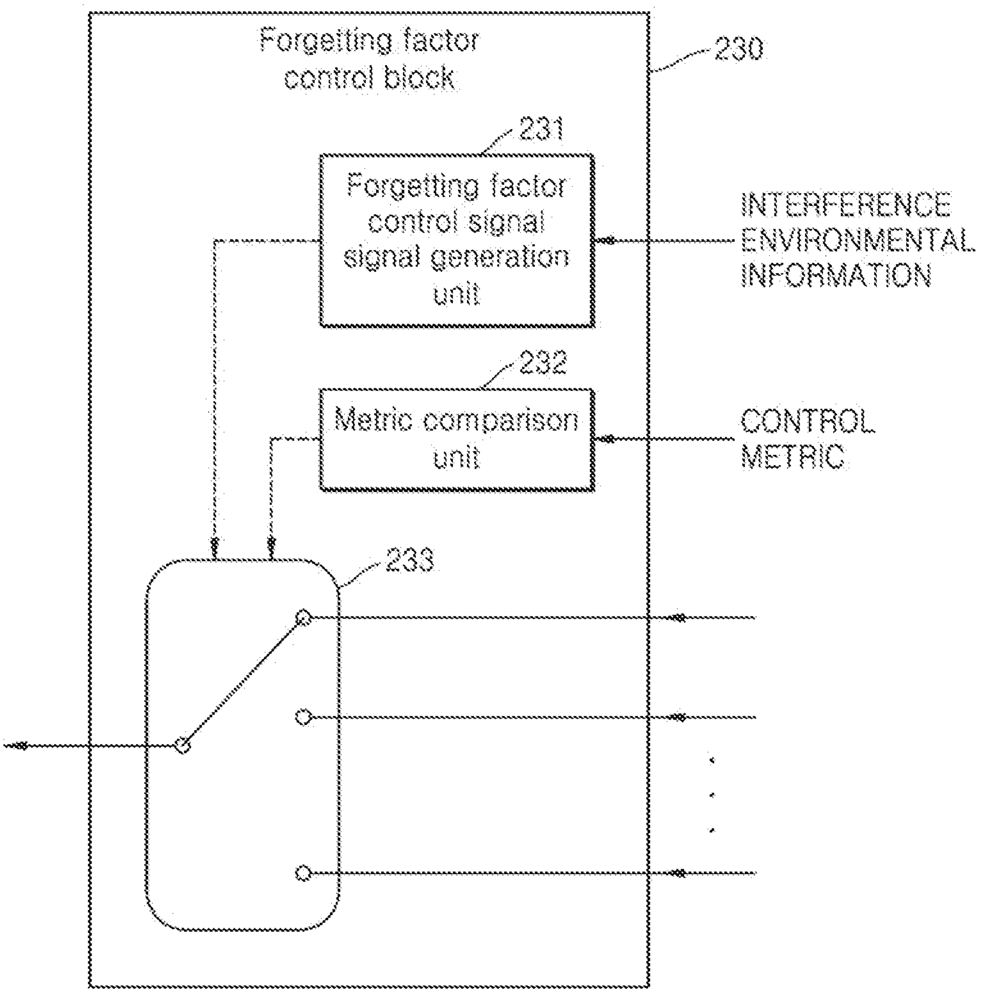
FIG. 5 illustrates the forgetting factor control circuit according to embodiments of the disclosure.

FIG. 5 is a detailed block diagram of the forgetting factor control circuit (or forgetting factor control block) 230 according to embodiments of the disclosure.

Referring to FIG. 5, the forgetting factor control circuit 230 may include a forgetting factor control signal generation unit 231, a metric comparison unit 232, and a multiplexer 233.

The forgetting factor control signal generation unit 231 may generate a forgetting factor control signal in response to reception of the interference environmental information. For example, the forgetting factor control signal generation unit 231 may generate a control signal to control the forgetting factor in response to a new reception of the interference environmental information while the activation control signal received from the activation circuit 220 remains “logic high”. For example, when the activation control signal is maintained at “logic high” and enters a normal state, the forgetting factor setting value may be maintained at the N-th value. In this case, when interference environmental information that may affect the magnitude and phase of the interference channel is newly received, a control signal for changing the forgetting factor setting value from the N-th value to the lowest value may be generated.

The metric comparison unit 232 may receive a control metric and provide a comparison result to the multiplexer 233 by comparing the control metric with a plurality of previously stored threshold values. The multiplexer 233 may receive the first to N-th values of the forgetting factor as an input, output one of the first to N-th values based on the comparison result received from the metric comparison unit 232, and provide the value to the adaptive filter 250.

According to the embodiments described above, the forgetting factor control circuit 230 is illustrated to include the multiplexer 233 but is not limited thereto. According to one or more embodiments, the multiplexer 233 of the forgetting factor control circuit 230 may be implemented as a lookup table (LUT) that stores the set value of the mapped forgetting factor according to the control metric value. In this case, the LUT may be based on an exponential function using a control metric and a forgetting factor as variables. For example, the LUT may use the set value of the mapped forgetting factor as a value obtained by quantizing the following equation.

$$\text{forgetting factor} = -a^{-(t-b)} + 1,\ a > 1,\ b < 0 \qquad \text{[Equation 1]}$$

According to one or more embodiments, when the control metric is used as an MSE rather than time, the MSE used as the control metric may be calculated alternatively according to the following equation.

$$\hat{\sigma}_e^2(n) = \alpha\hat{\sigma}_e^2(n-1) + (1-\alpha)e^2(n) \qquad \text{[Equation 2]}$$

Here, e(n) is an error signal of RLS, and α is a fixed weight factor, $$\sigma_s^2(n)$$

is mean square error, wherein, n is a natural number of 2 or more. The value of the forgetting factor according to the MSE may be mapped in advance, or the output result may be used by inputting the MSE as an input of an exponential function with the forgetting factor over time.

Figure 6:
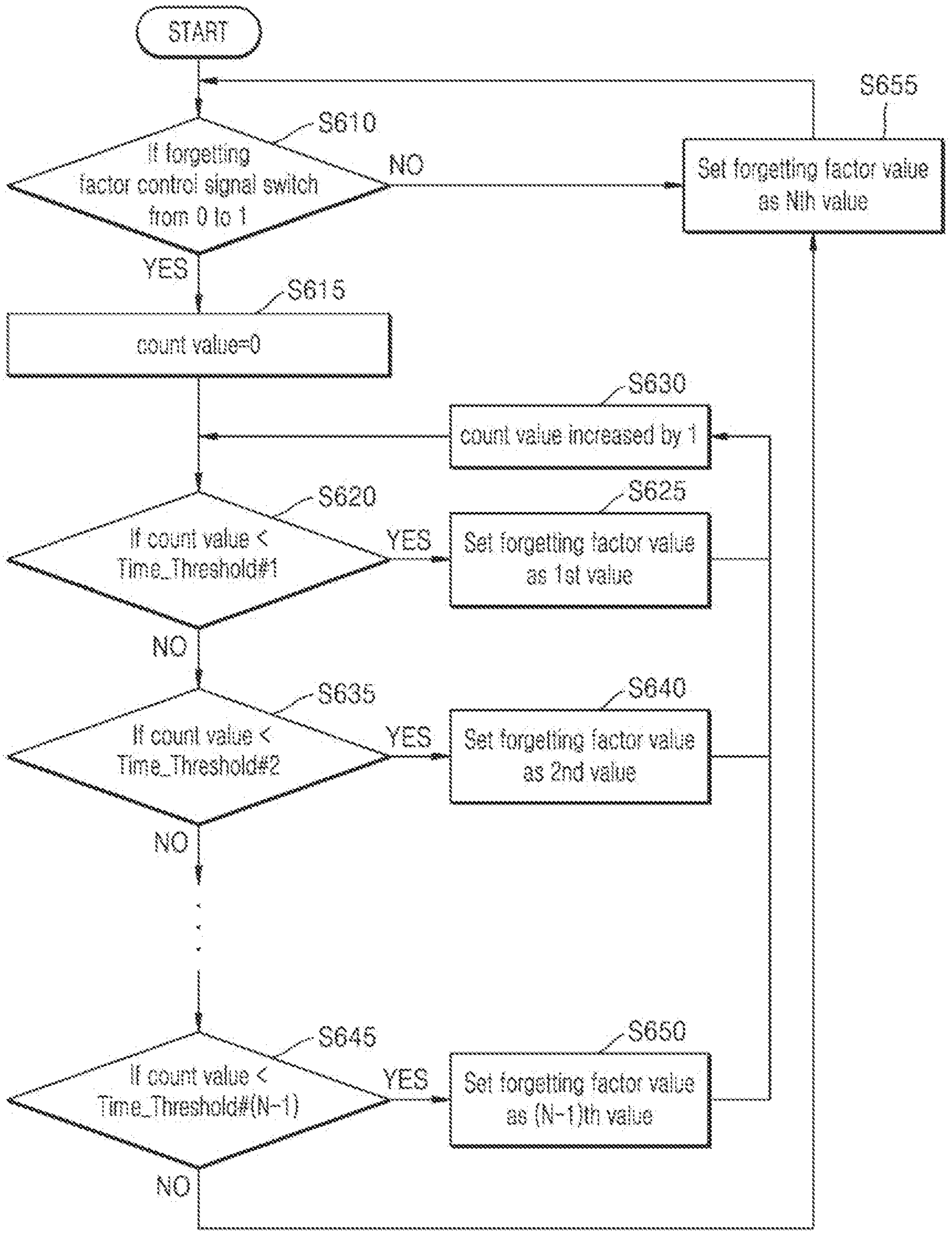
FIG. 6 illustrates an operating method of N-step forgetting factor control according to an embodiment of the disclosure.

FIG. 6 is a flowchart illustrating an operating method of N-step forgetting factor control according to an embodiment of the disclosure. FIG. 6 is an example of using a control metric as time.

Figure 7A:
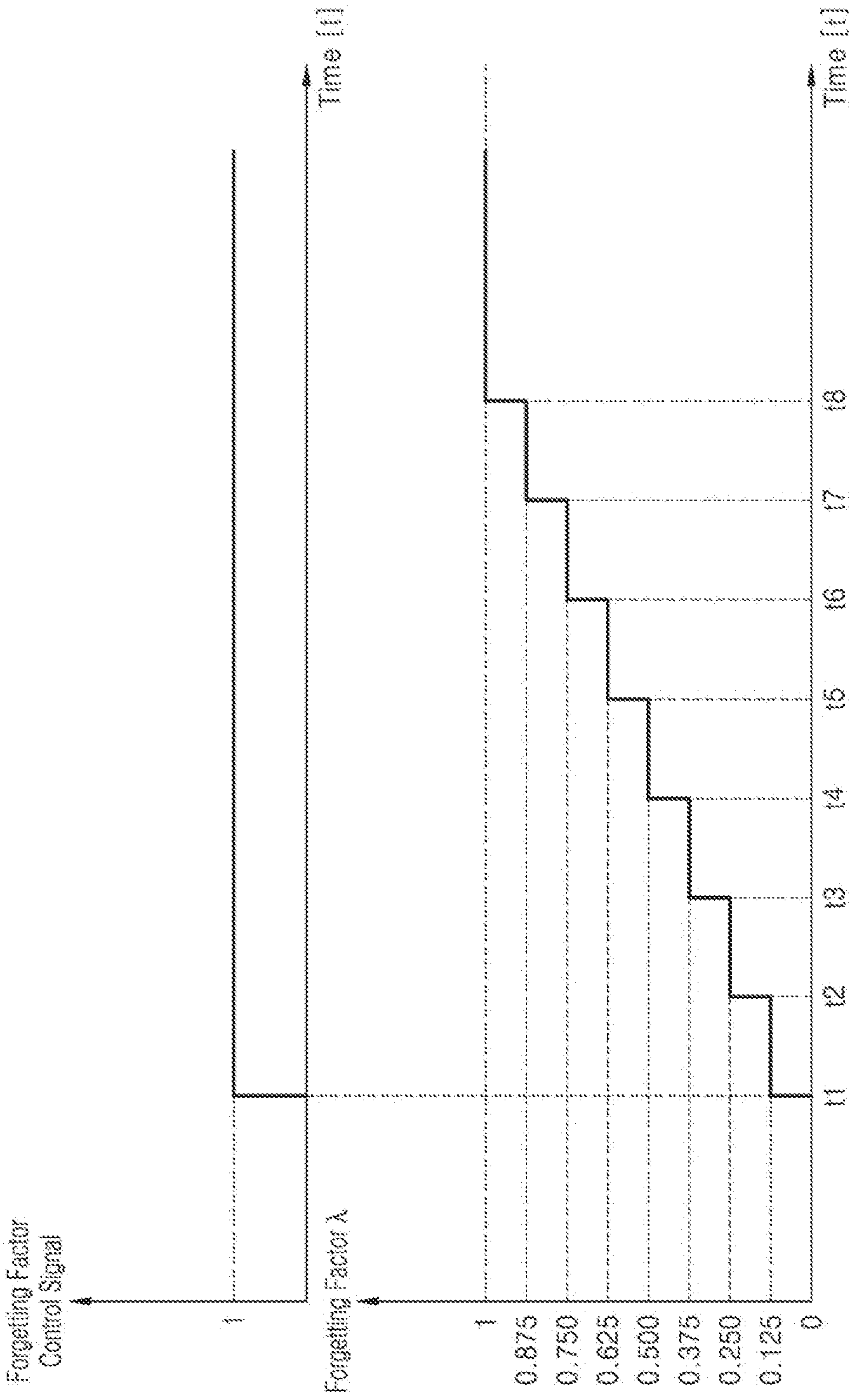
FIG. 7A illustrates changes in forgetting factors over time when N-step forgetting factors are controlled according to an embodiment of the disclosure.

Referring to FIG. 6, in operation S610, a forgetting factor control signal may switch from "logic low" to "logic high" (e.g., switch from 0 to 1). For example, when the forgetting factor control circuit 230 receives an activation control signal from the activation circuit 220, the forgetting factor control circuit 230 may set the forgetting factor control signal to "logic high" in response to the activation control signal. As another example, when the interference environmental information is newly received while the activation control signal is "logic high", the forgetting factor control circuit 230 may set the forgetting factor control signal to "logic high" in response to the reception of the interference environmental information. Referring also to FIG. 7A, the forgetting factor control signal may switch from "logic low" to "logic high" at time point t1.

In operation S615, the forgetting factor control circuit 230 may set the count value to 0. The count value increases over time, which is a control metric, and may be compared with a threshold value. That is, referring also to FIG. 7A, the count value of 0 may be at the time point t1 or immediately after the time point at which the forgetting factor control signal transitions to "logic high".

In operation S620, the forgetting factor control circuit 230 may compare the count value with the first threshold value. When the count value is less than the first threshold value by comparing the count value with the first threshold value, the metric comparison unit 232 of the forgetting factor control circuit 230 proceeds to operation S625 so that the interference channel is in an initial change state to set the forgetting factor to a less value, thereby increasing the rate of the coefficient estimation. Referring also to FIG. 7A, the first threshold value may correspond to a time value at time point t2.

In operation S625, the forgetting factor control circuit 230 may set the forgetting factor value as a first value. The metric comparison unit 232 of the forgetting factor control circuit 230 may provide, to the multiplexer 233, a control signal indicating that the count value is less than the first threshold value. The first value may be the least value among the plurality of values that may be set in the forgetting factor. After setting the forgetting factor value to the first value, the count value may be increased by 1 by proceeding to operation S630. Referring also to FIG. 7A, the first value may be 0.125, which is the least value among values greater than 0 and less than 1.

In operation S635, the forgetting factor control circuit 230 may compare the count value with the second threshold value. As it is repeatedly returned to operation S630, the count value may increase over time. That is, after setting the forgetting factor value to the first value, the count value of the comparison result of operation S620 may be greater than the first threshold value as a predetermined time elapses. Referring also to FIG. 7A, as a predetermined time elapses after time point t1, a count value may exceed the first threshold value at time point t2. Accordingly, the metric comparison unit 232 may compare the second threshold value that is greater than the first threshold value with the count value. The metric comparison unit 232 compares the count value with the second threshold value and, when the count value is less than the second threshold value, proceeds to operation S640 to increase the forgetting factor value.

In operation S640, the forgetting factor control circuit 230 may set the forgetting factor value to a second value. The second value may be greater than the first value set at an initial time point of change of the interference channel. Referring also to FIG. 7A, the second value may be 0.25. The metric comparison unit 232 of the forgetting factor control circuit 230 may provide the multiplexer 233 with a control signal indicating that the count value is greater than the first threshold value and less than the second threshold value. After setting the forgetting factor value to the second value, the count value may be increased by 1 by proceeding to operation S630.

In operation S645, the forgetting factor control circuit 230 may compare the count value with the (N−1)-th threshold value. As it is repeatedly returned to operations S620, S635, S640, and S630, the count value may increase over time. That is, after setting the forgetting factor value to the second value, the count value of the comparison result of operation S635 may be greater than the second threshold value over time. Accordingly, the metric comparison unit 232 may compare the (N−1)-th threshold value with the count value.

Referring also to FIG. 7A, the (N−1)-th threshold value may correspond to a time value at a time point t8. The (N−1)-th threshold value may be a threshold value of the greatest value among the plurality of threshold values for comparison with the control metric. The metric comparison unit 232 compares the count value with the (N−1)-th threshold value and, when the count value is less than the (N−1)-th threshold value, proceeds to operation S650 to set the forgetting factor value to the (N−1)-th value. The metric comparison unit 232 compares the count value with the (N−1)-th threshold value and, when the count value is greater than the (N−1)-th threshold value, proceeds to operation S655 to set the forgetting factor value to the N-th value. The N-th value may correspond to the greatest value among the plurality of values in which the forgetting factor may be set. In other words, as the convergence rate of the coefficient estimation enters the normal state, the forgetting factor control circuit 230 may set the forgetting factor value to be the greatest so that the convergence rate is slow, but the MSE performance is improved in the normal state. For example, the N-th value may be "1".

Figure 7B:
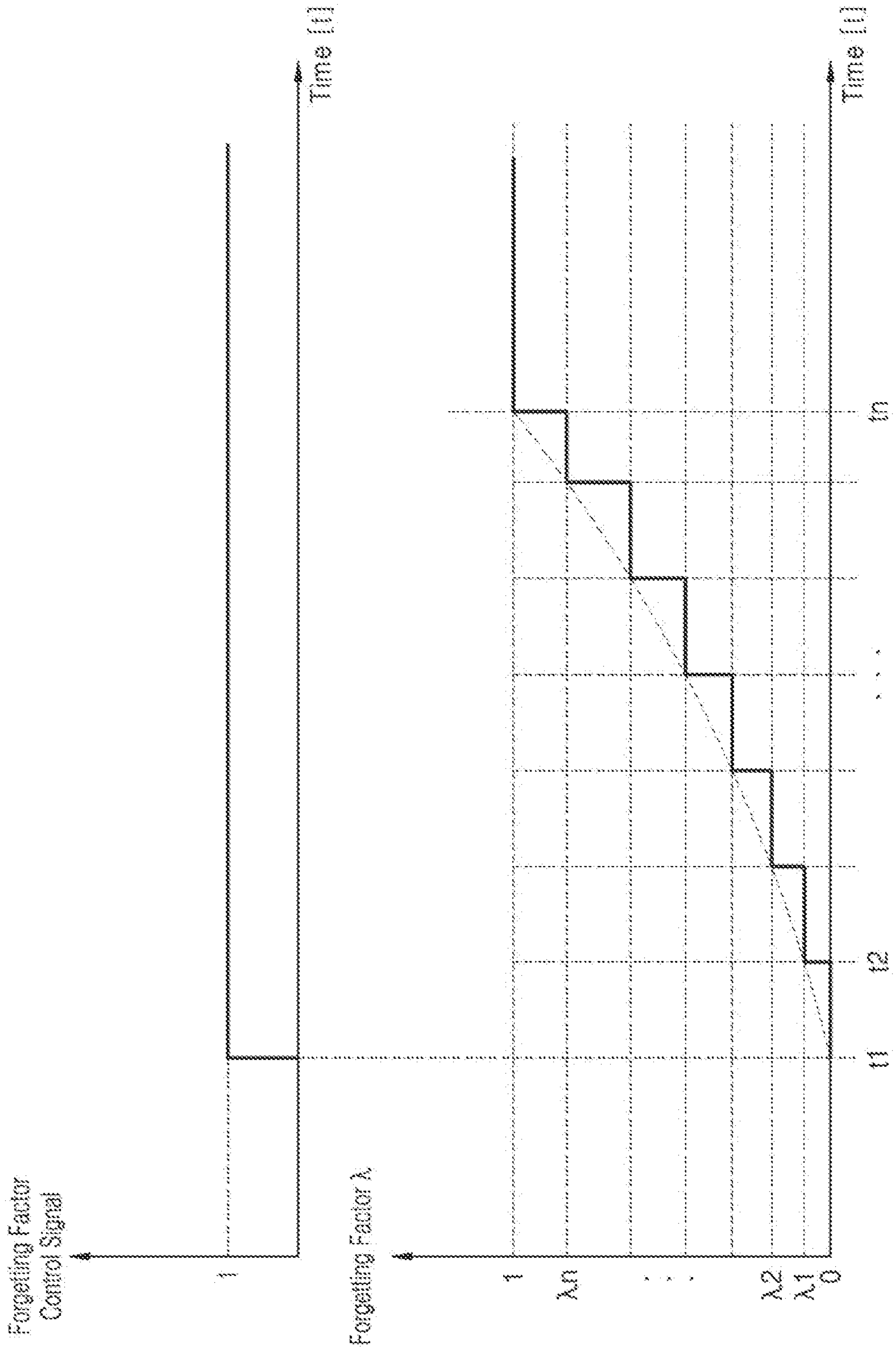
FIG. 7B illustrates changes in forgetting factors over time when N-step forgetting factors are controlled according to an embodiment of the disclosure.

Referring to FIG. 7A, 'n' variable factors are present between 0 and 1, and the n variable factors are shown to have the same interval, but the embodiments are not limited thereto. According to one or more embodiments, referring to FIG. 7B, n variable factors between 0 and 1 may increase according to different intervals. For example, the n variable factors may correspond to exponentially increasing values, respectively.

Figure 8:
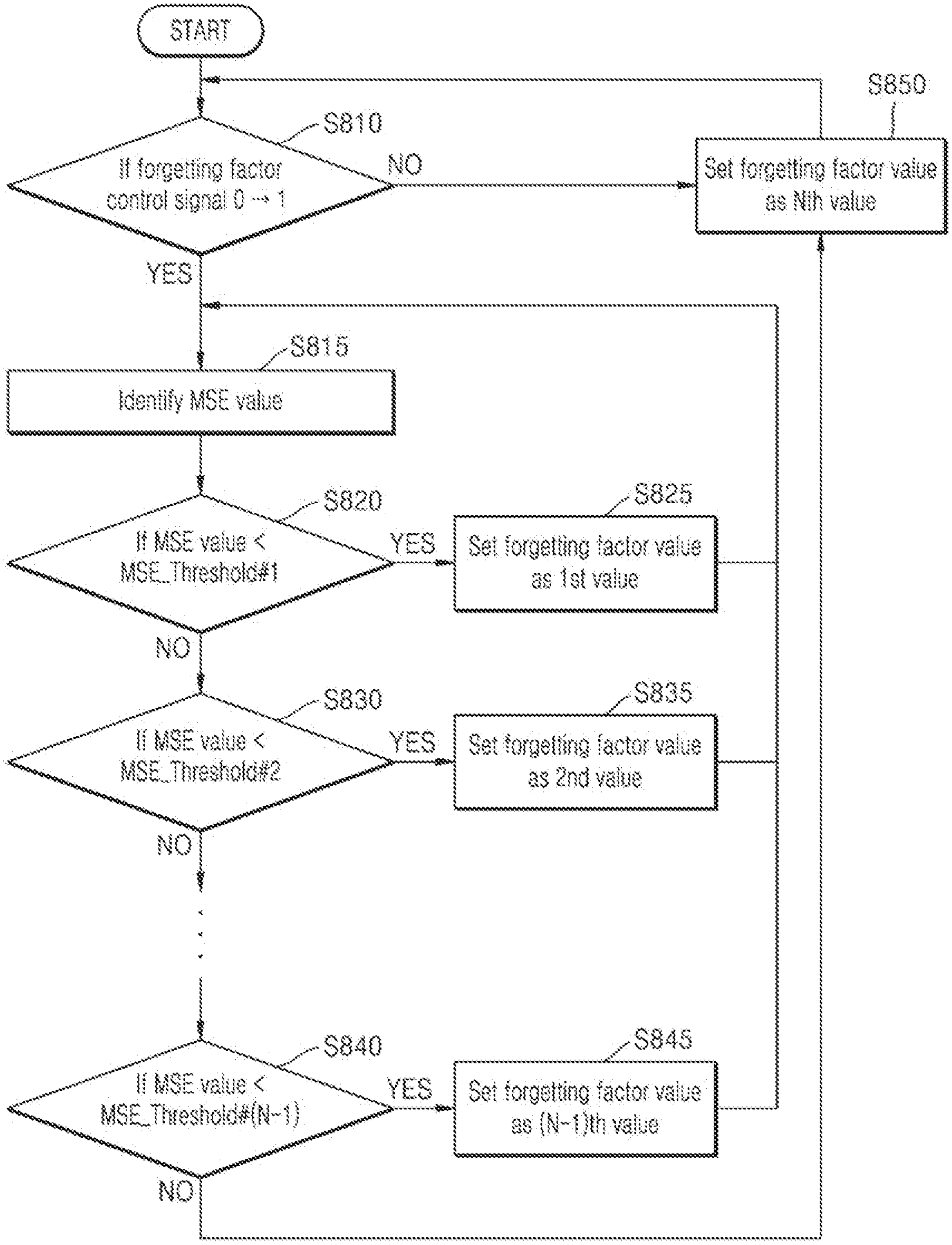
FIG. 8 illustrates an operating method of N-step forgetting factor control according to another embodiment of the disclosure.

FIG. 8 is a flowchart illustrating an operating method of N-step forgetting factor control according to an embodiment of the disclosure. FIG. 8 is an example of using an MSE as a control metric.

Referring to FIG. 8, in operation S810, a forget factor control signal may switch from "logic low" to "logic high". For example, when the forgetting factor control circuit 230 receives an activation control signal from the activation circuit 220, the forgetting factor control circuit 230 may set the forgetting factor control signal to "logic high" in response to the activation control signal. As another example, when the interference environmental information is newly received while the activation control signal is "logic high", the forgetting factor control circuit 230 may set the forgetting factor control signal to "logic high" in response to the reception of the interference environmental information.

In operation S815, the forgetting factor control circuit 230 may identify the MSE value. Thereafter, the forgetting factor control circuit 230 may determine to change the forgetting factor value by comparing the identified MSE value with the plurality of MSE values. For example, in operation S820, the forgetting factor control circuit 230 may compare the identified MSE value with the first MSE threshold value. When the identified MSE value is less than the first MSE threshold value, the forgetting factor control circuit 230 may proceed to operation S825, and set the forgetting control factor to the first value. The forgetting factor control circuit 230 may set the forgetting control factor to the first value in operation S825, and then proceed to operation S815 again to check whether the MSE value has changed.

When the identified MSE value is greater than the first MSE threshold, the forgetting factor control circuit 230 may proceed to operation S830 and compare the next threshold value with the second MSE threshold value. When the identified MSE value is less than the second MSE threshold value, the forgetting control factor may be set to the second value by proceeding to operation S835. The second value may be a value greater than the first value. The forgetting factor control circuit 230 may set the forgetting control factor to the second value in operation S835, and then proceed to operation S815 again to check whether the MSE value has changed.

When the identified MSE value is greater than the second MSE threshold, the forgetting factor control circuit 230 may proceed to operation S840 and compare the next threshold value with the (N−1)-th MSE threshold value. It is omitted for the forgetting factor control circuit 230 to compare between the identified MSE value and the third MSE threshold to the (N−2)-th MSE threshold.

When the identified MSE value is less than the (N−1)-th MSE threshold value, the forgetting factor control circuit 230 may proceed to operation S845, and set the forgetting control factor to the (N−1)-th value. The (N−1)-th value may be a value greater than the second value. The forgetting factor control circuit 230 may set the forgetting control factor to the (N−1)-Th value in operation S835, and then proceeds to operation S815 again to check whether the MSE value has changed.

When the identified MSE value is greater than the (N−1)-th MSE threshold value, the forgetting control factor may be set to the N-th value by proceeding to operation S850. The N-th value may be a value greater than the (N−1)-th value. For example, the N-th value may correspond to the greatest value among the plurality of values in which the forgetting factor may be set. In other words, as the convergence rate of the coefficient estimation enters the normal state, the forgetting factor control circuit 230 may set the forgetting factor value to be the greatest so that the convergence rate is slow, but the MSE performance is improved in the normal state. In the embodiment described above, the control metric is described as only MSE but is not limited thereto. According to one or more embodiments, the control metric may be an MSR.

Figure 9:
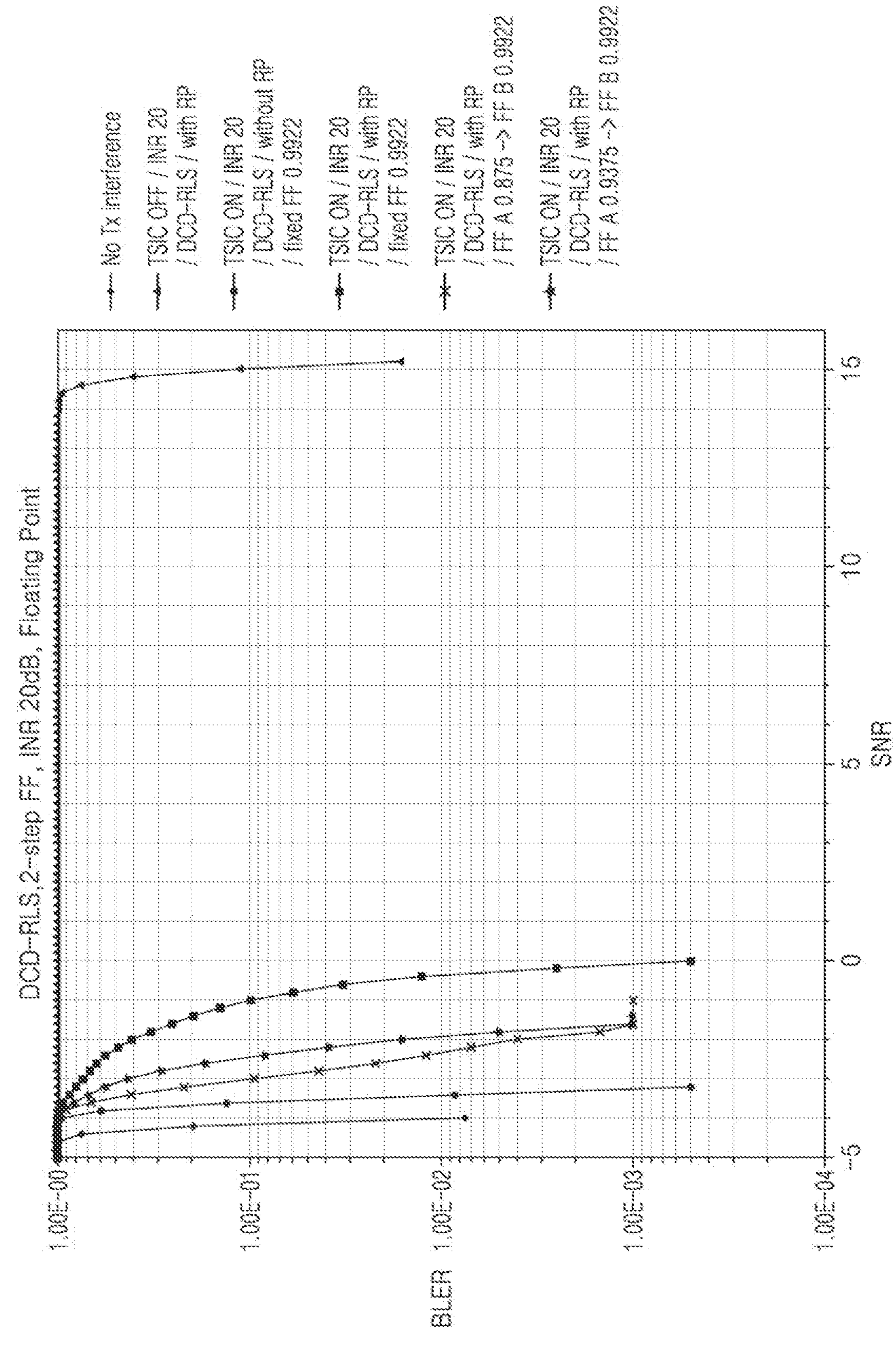
FIG. 9 illustrates a performance improvement of an interference cancellation circuit according to an embodiment of the disclosure.

FIG. 9 is a graph illustrating performance improvement of an interference cancellation circuit according to an embodiment of the disclosure.

Referring to FIG. 9, the interference cancellation circuit 214 may vary the forgetting factor over two-steps. In addition, according to the simulation environment of FIG. 9, the interference type is third order intermodulation distortion IMD3, the INR of the noise-to-interference ratio is 20 dB, the bandwidth of the first transmission filter 110 is 10 MHz, the bandwidth of the second transmission filter 120 is 5 MHZ, and the bandwidth of the reception filter 210 is 10 MHz, based on the noise environment of additive white Gaussian noise (AWGN). In addition, the interference channel is changed twice within one slot, and the random phase resolution is set to 2π/100.

Due to the change in the interference channel, it may be controlled to vary the forgetting factor over two-steps in an environment in which a random phase is present. In this case, the first value among the forgetting factor values may be 0.875 and the second value may be preset to 0.9922. When a fixed forgetting factor (=0.9922) is used, it may be identified that performance is improved by a signal to noise ratio (SNR) of about 2 dB in a section having a block error rate (BLER) of 5%. This is because the convergence rate of the RLS is increased in the section in which the phase is changed according to the random phase, and thus, the section in which the error signal is great is reduced. In an embodiment, DCD represent dichotomous coordinate descent, FF represent forgetting factor and RP represent random phase.

Figure 10:
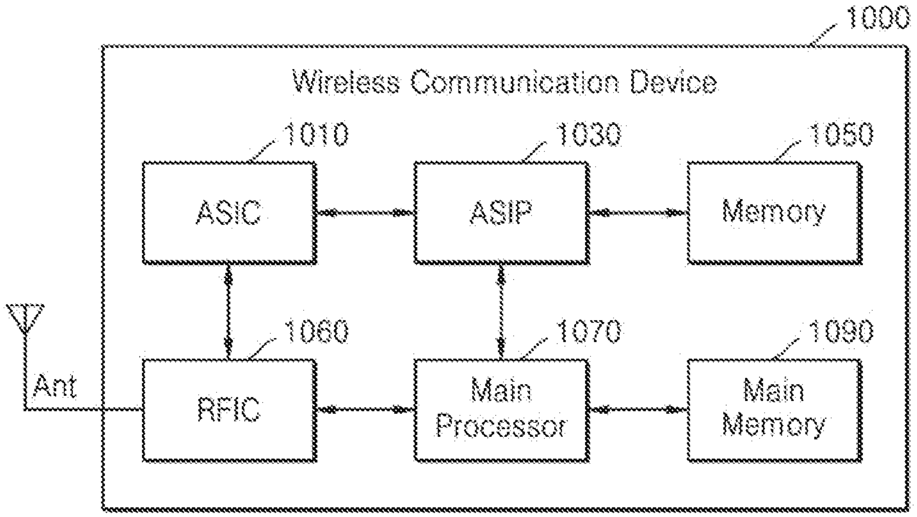
FIG. 10 illustrates a wireless communication device according to an embodiment of the disclosure.

FIG. 10 is a block diagram of a wireless communication device according to an embodiment of the disclosure.

Referring to FIG. 10, a wireless communication device 1000 may include a modem and an RFIC 1060, and the modem may include an application specific integrated circuit (ASIC) 1010 and an application specific instruction set processor (ASIP) 1030, a memory 1050, a main processor 1070, and a main memory 1090. The wireless communication device 1000 of FIG. 10 may be a wireless communication device 10 according to an embodiment of the disclosure.

The RFIC 1060 may be connected to an antenna Ant to receive a signal from the outside or transmit a signal to the outside using a wireless communication network. The ASIP 1030 is a customized integrated circuit for a specific purpose, and may support a dedicated instruction set for a specific application and execute instructions included in the instruction set. The memory 1050 may communicate with the ASIP 1030 and may store a plurality of instructions executed by the ASIP 1030 as a non-transitory storage device. For example, the memory 1050 may include, as non-limiting examples, any type of memory accessible by the ASIP 1030, as in random access memory (RAM), read only memory (ROM), tape, a magnetic disk, an optical disk, volatile memory, non-volatile memory, and combinations thereof.

The main processor 1070 may control the wireless communication device 1000 by executing a plurality of instructions. For example, the main processor 1070 may control the ASIC 1010 and the ASIP 1030, process data received through a wireless communication network, or process a user input to the wireless communication device 1000. For example, the main processor 1070 may generate a physical uplink shared channel (PUSCH) signal according to scheduling based on a variable rank. Accordingly, the efficiency of scheduling and resource allocation may be improved by freely selecting user equipment (UE) and a rank combination for each location of the frequency resource.

The main memory 1090 may communicate with the main processor 1070, and may store a plurality of instructions executed by the main processor 1070 as a non-transitory storage device. For example, the main memory 1090 may include, as non-limiting examples, any type of memory accessible by the main processor 1070, as in RAM, ROM, tape, a magnetic disk, an optical disk, volatile memory, non-volatile memory, and combinations thereof.

As is traditional in the field, embodiments are described and illustrated in terms of blocks or symbols, as shown in the drawings, which carry out a described function or functions. These blocks or symbols, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

While the disclosure has been particularly shown and described with reference to embodiments thereof, it will be understood that various changes in form and details may be made therein without departing from the spirit and scope of the following claims.

What is claimed is:

1. An interference cancellation circuit comprising:

an activation circuit configured to receive at least one transmission path signal and a reception path signal and configured to generate an activation control signal based on at least one of the reception path signal and the at least one transmission path signal;

a forgetting factor control circuit configured to compare a control metric with a plurality of threshold values and control a forgetting factor value based on the control metric compared with the plurality of threshold values;

a kernel generation circuit configured to receive a transmission signal corresponding to the at least one transmission path signal and configured to generate an interference model; and an adaptive filter configured to receive a kernel signal from the kernel generation circuit, and configured to receive the forgetting factor value from the forgetting factor control circuit to cancel self-interference, wherein the control metric indicates a determination criterion for changing the forgetting factor value.

2. The interference cancellation circuit of claim 1, wherein the activation control signal is generated based on both the reception path signal and the at least one transmission path signal.

3. The interference cancellation circuit of claim 1, wherein the control metric corresponds to any one of time, mean square error (MSE), and mean square residual (MSR).

4. The interference cancellation circuit of claim 1, wherein the forgetting factor control circuit is further configured to compare the control metric with a first threshold value among the plurality of threshold values, and configured to set the forgetting factor value to a first value based on the control metric being less than the first threshold value, and wherein the first threshold value is the smallest threshold value among the plurality of threshold values.

5. The interference cancellation circuit of claim 4, wherein the forgetting factor control circuit is further configured to compare the control metric with a second threshold value that is greater than the first threshold value based on the control metric being greater than the first threshold value, and wherein the forgetting factor control circuit is further configured to set the forgetting factor value to a second value based on the control metric being greater than the first threshold value and being less than the second threshold value.

6. The interference cancellation circuit of claim 1, wherein the adaptive filter is based on at least one of an algorithm comprising Recursive Least Square (RLS) and a Kalman filter.

7. The interference cancellation circuit of claim 1, wherein the forgetting factor control circuit is further configured to receive interference environmental information based on the activation control signal being logic high, and wherein the forgetting factor control circuit is further configured to set the forgetting factor value to a first value based on the received interference environmental information.

8. The interference cancellation circuit of claim 7, wherein the interference environmental information comprises at least one of an ON/OFF signal on a transmission path and an ON/OFF signal on a reception path.

9. An operating method performed by an interference cancellation circuit, the operating method comprising:

receiving a transmission path signal and a reception path signal;

generating an activation control signal based on the transmission path signal and the reception path signal;

setting a forgetting factor of a Recursive Least Square (RLS) filter to a smallest first value from among a set of a first value to an N-th value based on the activation control signal; and comparing a control metric with a plurality of threshold values and setting the forgetting factor up to the N-th value based on the control metric compared with the plurality of threshold values, wherein the control metric indicates a determination criterion for changing a value of the forgetting factor.

10. The operating method of claim 9, wherein the control metric corresponds to any one of time, mean square error (MSE) and mean square residual (MSR).

11. The operating method of claim 9, wherein the setting the forgetting factor up to the N-th value comprises a comparison of the control metric with a first threshold value being smallest among the plurality of threshold values; and based on the control metric being less than the first threshold value, setting the forgetting factor as the first value.

12. The operating method of claim 11, further comprising:

based on the control metric being greater than the first threshold value, comparing the control metric with a second threshold value being greater than the first threshold value; and setting the forgetting factor to a second value based on the control metric being greater than the first threshold value and being less than the second threshold value.

13. The operating method of claim 12, further comprising receiving the forgetting factor by an adaptive filter based on at least based on an algorithm comprising Recursive Least Square (RLS) and a Kalman filter.

14. The operating method of claim 9, further comprising:

based on the activation control signal being logic high, receiving interference environmental information; and setting the forgetting factor as a first value based on the interference environmental information.

15. The operating method of claim 14, wherein the interference environmental information comprises at least one of an ON/OFF signal on a transmission path and an ON/OFF signal on a reception path.

16. The operating method of claim 9, further comprising:

generating an interference signal based on an algorithm of an adaptive filter, the algorithm comprising the forgetting factor and a transmission signal corresponding to the transmission path signal; and subtracting the interference signal from a reception signal.

17. A wireless communication device comprising:

a first transmission radio frequency (RF) chain configured to output a first transmission signal;

a second transmission RF chain configured to output a second transmission signal;

a reception RF chain corresponding to a reception path in which a reception signal is input; and an interference cancellation circuit comprising:

an activation circuit configured to generate an activation control signal in response to receiving (i) a first transmission path signal corresponding to the first transmission RF chain, (ii) a second transmission path signal corresponding to the second transmission RF chain, and (iii) a reception path signal corresponding to the reception RF chain, a forgetting factor control circuit configured to compare a control metric with a plurality of threshold values and configured to control a forgetting factor value based on the compared control metric with the plurality of threshold values, a kernel generation circuit configured to receive the first transmission signal and the second transmission signal and configured to generate an interference model, and an adaptive filter configured to receive a kernel signal from the kernel generation circuit, and configured to receive the forgetting factor value from the forgetting factor control circuit to cancel self-interference, wherein the control metric indicates a determination criterion for changing the forgetting factor value.

18. The wireless communication device of claim 17, wherein the control metric corresponds to any one of time, mean square error (MSE), and mean square residual (MSR).

19. The wireless communication device of claim 17, wherein the forgetting factor control circuit is further configured to:

compare the control metric with a first threshold value among the plurality of threshold values;

based on the control metric being less than the first threshold value, set the forgetting factor value as a first value;

based on the control metric being greater than the first threshold value, compare the control metric with a second threshold value being greater than the first threshold value; and set the forgetting factor value to a second value based on the control metric being greater than the first threshold value and being less than the second threshold value, wherein the second value is greater than the first value, and wherein the first threshold value is the smallest threshold value among the plurality of threshold values.

20. The wireless communication device of claim 17, wherein the adaptive filter is based on at least one of an algorithm comprising Recursive Least Square (RLS) and a Kalman filter.

* * * * *